United States Patent
Livoti et al.

(10) Patent No.: US 11,676,073 B2
(45) Date of Patent: Jun. 13, 2023

(54) METHODS AND APPARATUS TO ANALYZE PERFORMANCE OF WATERMARK ENCODING DEVICES

(71) Applicant: The Nielsen Company (US), LLC, New York, NY (US)

(72) Inventors: John T. Livoti, Clearwater, FL (US); Susan Cimino, Odessa, FL (US); Stanley Wellington Woodruff, Palm Harbor, FL (US); Rajakumar Madhanganesh, Tampa, FL (US); Alok Garg, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/373,616

(22) Filed: Jul. 12, 2021

(65) Prior Publication Data
US 2021/0342746 A1 Nov. 4, 2021

Related U.S. Application Data

(63) Continuation of application No. 16/231,171, filed on Dec. 21, 2018, now Pat. No. 11,062,233.

(51) Int. Cl.
*G06F 11/00* (2006.01)
*G06N 20/00* (2019.01)
(Continued)

(52) U.S. Cl.
CPC ......... *G06N 20/00* (2019.01); *G06F 11/0748* (2013.01); *G06F 11/0754* (2013.01); *G06F 11/0766* (2013.01); *G06F 11/2263* (2013.01)

(58) Field of Classification Search
CPC ............... G06F 11/008; G06F 11/0751; G06F 11/0754; G06F 11/0766; G06F 11/0769;
(Continued)

(56) References Cited

U.S. PATENT DOCUMENTS 7,904,195 B2 3/2011 Chao et al.
8,914,149 B2 12/2014 Safa-Bakhsh et al.
(Continued)

OTHER PUBLICATIONS

Gauher, "Evaluating Failure Prediction Models for Predictive Maintenance," Machine Learning Blog, Apr. 19, 2016, 7 pages.
(Continued)

*Primary Examiner* — Marc Duncan
(74) *Attorney, Agent, or Firm* — Hanley, Flight & Zimmerman, LLC

(57) ABSTRACT

Methods, apparatus, systems, and articles of manufacture are disclosed that analyze performance of manufacturer independent devices. An example apparatus includes a software development kit (SDK) deployment engine to deploy an SDK to a manufacturer of a device, the SDK to define heartbeat data to be collected from the device and interfacing techniques to transmit the heartbeat data to a measurement entity. In some examples, the apparatus includes a machine learning engine to predict whether the device is associated with one or more failure modes. The example apparatus also includes an alert generator to generate an alert based on a prediction, the alert to indicate at least one of a type of a first one of the failure modes or at least one component of the device to be remedied according to the first one of the one or more failure modes, and transmit the alert to a management agent.

17 Claims, 7 Drawing Sheets

(51) Int. Cl.
*G06F 11/07* (2006.01)
*G06F 11/22* (2006.01)

(58) Field of Classification Search
CPC ............. G06F 11/2257; G06F 11/2263; G06F 11/3058; G06F 11/321; G06F 11/327; G06F 11/3447; G06F 11/3452; G06N 20/00; G06N 20/10; G06N 20/20; G06N 7/005
See application file for complete search history.

(56) References Cited

U.S. PATENT DOCUMENTS

| | | | |
|---|---|---|---|
| 9,542,296 B1 * | 1/2017 | Engers | G06F 11/008 |
| 9,811,057 B2 | 11/2017 | Zhi | |
| 9,881,428 B2 | 1/2018 | Barfield, Jr. et al. | |
| 10,713,109 B2 * | 7/2020 | Tarlano | G06F 9/542 |
| 11,036,456 B1 | 6/2021 | Chor et al. | |
| 11,062,233 B2 * | 7/2021 | Livoti | G06N 3/08 |
| 2011/0066437 A1 * | 3/2011 | Luff | G06Q 30/02 |
| | | | 704/254 |
| 2014/0343895 A1 | 11/2014 | Hencken et al. | |
| 2015/0246179 A1 | 9/2015 | Zur et al. | |
| 2016/0203036 A1 * | 7/2016 | Mezic | G06N 7/005 |
| | | | 714/819 |
| 2017/0117841 A1 | 4/2017 | Watanabe et al. | |
| 2017/0331709 A1 | 11/2017 | Lam et al. | |
| 2018/0373233 A1 | 12/2018 | Goto | |
| 2019/0087256 A1 * | 3/2019 | Horrell | G06F 11/0721 |
| 2019/0179300 A1 | 6/2019 | Celia et al. | |
| 2019/0196430 A1 | 6/2019 | Seo et al. | |
| 2019/0235941 A1 * | 8/2019 | Bath | G06F 16/24553 |
| 2019/0311430 A1 * | 10/2019 | Raleigh | H04M 15/68 |
| 2020/0026589 A1 * | 1/2020 | Ghosh | G06F 9/4881 |
| 2020/0133753 A1 * | 4/2020 | Olson | G06N 3/084 |
| 2020/0158041 A1 | 5/2020 | Smith | |
| 2020/0201735 A1 | 6/2020 | Livoti et al. | |
| 2021/0018264 A1 | 1/2021 | Ganguly et al. | |
| 2021/0160125 A1 | 5/2021 | Cheng | |
| 2021/0366601 A1 | 11/2021 | Livoti et al. | |
| 2022/0006714 A1 | 1/2022 | Wang et al. | |

OTHER PUBLICATIONS

The Nielsen Company (US), LLC, "AnaDig 1000-1212 Encoder Equipment Manual," Document# 1050-1645, 2017, 159 pages.

Texas Instruments Incorporated, "AM1808 ARM Microprocessor," SPRS653E, Feb. 2010, Revised Mar. 2014, 266 pages.

ADDA USA, "DC Fan Specifications", Mar. 26, 2018, 7 pages.

Inside Radio, "The Big Reveal: Nielsen Demos New Wearables PPMs at NAB Show," Apr. 9, 2019, 3 pages.

United States Patent and Trademark Office, "Notice of Allowance and Fee(s) Due," issued in connection with U.S. Appl. No. 16/231,171 dated Mar. 5, 2021, 6 pages.

United States Patent and Trademark Office, "Non-Final Rejection," issued in connection with U.S. Appl. No. 16/231,171 dated Aug. 27, 2020, 10 pages.

United States Patent and Trademark Office, "Non-Final Office Action," mailed in connection with U.S. Appl. No. 16/879,557 dated Mar. 25, 2022, 33 pages.

United States Patent and Trademark Office, "Final Office Action," mailed in connection with U.S. Appl. No. 16/879,557 dated Oct. 25, 2022, 27 pages.

United States Patent and Trademark Office, "Non-Final Office Action," issued in connection with U.S. Appl. No. 16/879,557, filed Feb. 16, 2023, 40 pages.

* cited by examiner

METHODS AND APPARATUS TO ANALYZE PERFORMANCE OF WATERMARK ENCODING DEVICES

RELATED APPLICATION

This patent arises from a continuation of U.S. patent application Ser. No. 16/231,171, (now U.S. Pat. No. 11,062, 233) which was filed on Dec. 21, 2018. U.S. patent application Ser. No. 16/231,171 is hereby incorporated herein by reference in its entirety. Priority to U.S. patent application Ser. No. 16/231,171 is hereby claimed.

FIELD OF THE DISCLOSURE

This disclosure relates generally to device failure modes, and, more particularly, to methods and apparatus to analyze performance of manufacturer independent devices.

BACKGROUND

In recent years, many manufacturers of device (e.g., encoders, meters, set top boxes, televisions, speakers, light systems, refrigerators, etc.) have included circuitry or other infrastructure to connect one or more devices to a network using different wireless protocols (e.g., Bluetooth, NFC, Wi-Fi, Li-Fi, 3G, LTE, etc.) to operate interactively between the one or more devices. The one or more devices can send and receive information in the form of downloadable content to/from other one or more devices in the network. The one or more devices communicate with the other one or more devices in the network via a server, data center, or other group of networked computers that are used for remote storage, processing, or distribution of large amounts of data.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
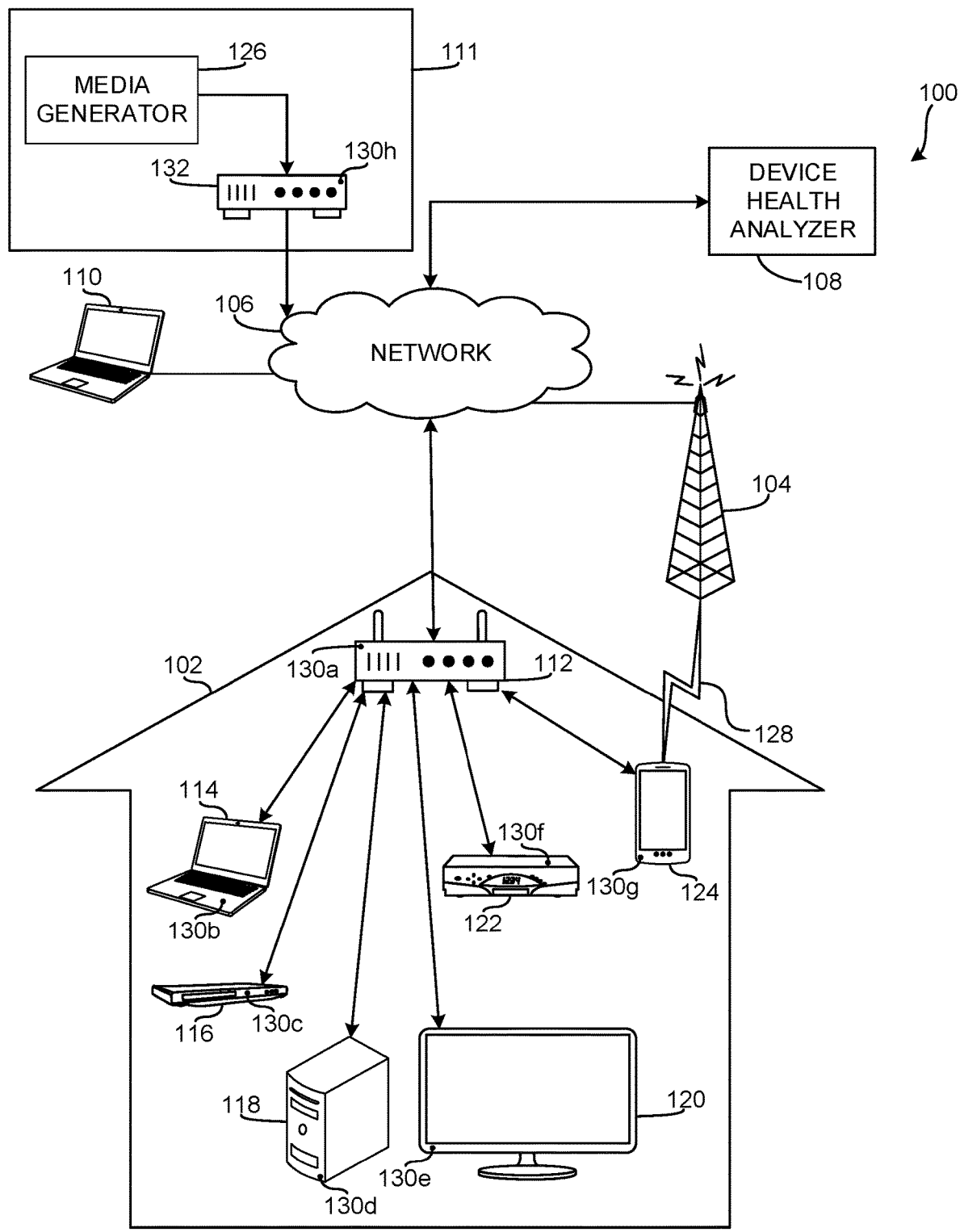
FIG. 1 is a block diagram of an example environment in which an example device health analyzer collects heartbeat data for one or more devices in a network.

Examples disclosed herein provide an apparatus to monitor watermark encoder operation, the apparatus comprising: a data collector to collect one or more types of heartbeat data via a network from a watermark encoder, the heartbeat data including time varying data characterizing an operational status of one or more components of the watermark encoder, the one or more types of the heartbeat data defined by a software development kit (SDK); a machine learning engine to process the heartbeat data to predict whether the watermark encoder is associated with respective ones of a plurality of failure modes; and an alert generator to, in response to the machine learning engine predicting the watermark encoder is associated with a first one of the failure modes, the first one of the failure modes associated with the operational status of at least one of the one or more components: generate an alert indicating at least one of (a) a type of the first one of the failure modes and (b) the at least one of the one or more components to be remedied according to the first one of the failure modes; and transmit the alert to a watermark encoder management agent. Each of the one or more devices in the network include various electrical components that have specified safe operating areas (SOAs). The SOA of a particular component designates the range of conditions (e.g., voltage level, current level, rotations per minute, temperature level, timing, etc.) that the component optimally operates within.

Over the lifetime of the one or more devices (e.g., encoders, meters, set top boxes, televisions, speakers, light systems, refrigerators, etc.) the performance of each of the one or more devices may degrade due to environmental and operational conditions.

For example, temperature is an environmental condition and an operational condition that affects the one or more devices performance. The temperature of the one or more devices may vary depending on whether the one or more devices are confined, open, cooled, or uncooled. A device in an open area is not affected by temperature in the same way as a similar device in a confined area. Similarly, a device that is cooled is not affected by temperature in the same was as a similar device that is not cooled.

As a device ages, the continued exposure to varying environmental and operational conditions causes the components of a device to degrade. Environmental and operational conditions that are close to exceeding or do exceed the SOA of a component of a device or more generally the SOA of the device, are herein defined as failure modes. Different types of failure modes are associated with the different environmental and operational conditions that cause the component of device or the device to be close to exceeding or exceed the SOA of the component or device. As the environmental and operational conditions of devices varies depending on the different environment in which a device is located or the operation that a device achieves, the specific state of a component and more generally the state of a device including the component cannot be accurately determined without data according to the device and component.

Currently, many manufacturers provide diagnostic tools to identify problems with a device. This allows the manufacturer to identify problems with a device manufactured by the manufacturer. However, currently there exists no automated way to analyze and predict the overall health and life expectancy of manufacturer independent devices.

FIG. 1 is a block diagram of an example environment 100 in which an example device health analyzer collects heartbeat data for one or more devices in a network. Heartbeat data is data that is useful in understanding the performance (e.g., the health) of a device. Heartbeat data includes fixed data and varying data. Fixed data corresponds to data relating to a device that is relatively static throughout the lifetime of a device or only varies slightly from one state to another (e.g., in use, not in use, SIM card inserted, no SIM card inserted, etc.) (e.g., the fixed data corresponding to characteristics that do not vary over time). Varying data corresponds to data relating to a device that varies over the lifetime of a device (e.g., part temperatures, fan speed, signal strength, failure counts, etc.).

The example environment 100 of FIG. 1 includes an example measurement location 102, an example wireless communication system 104, an example network 106, an example device health analyzer 108, an example device management agent 110, and an example media provider 111. The example measurement location 102 is coupled to the example wireless communication system 104 and the example network 106. The example wireless communication system 104 is coupled to the example network 106. The example device health analyzer 108 is coupled to the example network 106. The example device management agent 110 is coupled to the example network 106. The example media provider 111 is coupled to the example network 106.

The example measurement location 102 includes an example access point 112, an example laptop computer 114, an example media device 116, an example desktop computer 118, an example media presentation device 120, an example set top box 122, and an example mobile device 124. In the example, each of the example laptop computer 114, the example media device 116, the example desktop computer 118, the example media presentation device 120, the example set top box 122, and the example mobile device 124 is coupled to the access point 112. Additionally, the example mobile device 124 is coupled to the example wireless communication system 104 via an example wireless communication link 128. The example access point 112 is further coupled to the example network 106.

In the illustrated example of FIG. 1, each of the example access point 112, the example laptop computer 114, the example media device 116, the example desktop computer 118, the example media presentation device 120, the example set top box 122, and the example mobile device 124 includes a heartbeat data monitor, respectively, an example heartbeat data monitor 130a, an example data heartbeat monitor 130b, an example heartbeat data monitor 130c, an example heartbeat data monitor 130d, an example heartbeat data monitor 130e, an example heartbeat data monitor 130f, and an example heartbeat data monitor 130g. In some examples, the device management agent 110 includes a heartbeat data monitor.

The example measurement location 102 of the illustrated example of FIG. 1 is a panelist household. However, the measurement location 102 may be any other location, such as, for example a non-panelist household, a manufacturing environment, an office, an airport, a library, an Internet café, etc. While in the illustrated example a single measurement location is shown, any number and/or type(s) of measurement locations may be used.

The panelist household may include one or more panelists. The panelists are users registered on panels maintained by a ratings entity (e.g., an audience measurement company) that owns and/or operates the ratings entity subsystem. Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

People (e.g., households, organizations, etc.) register as panelists via, for example, a user interface presented on a media device (e.g., via a website). People may be recruited as panelists in additional or alternative manners such as, for example, via a telephone interview, by completing an online survey, etc. Additionally or alternatively, people may be contacted and/or enlisted to join a panel using any desired methodology (e.g., random selection, statistical selection, phone solicitations, Internet advertisements, surveys, advertisements in shopping malls, product packaging, etc.). In other examples, the measurement location 102 may correspond to people or organizations that subscribe to a service provided by an audience measurement entity.

The example network 106 of the illustrated example of FIG. 1 is the Internet. However, the example network 106 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 106 enables the example device health analyzer 108 to be in communication with the measurement location 102, the device management agent 110 and other measurement locations. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example of FIG. 1, the device health analyzer 108 is a server that collects and processes heartbeat data from the measurement location 102 to monitor device operation. The device health analyzer 108 analyzes the heartbeat data to identify, for example, the operational status of a component in a device in the network 106, the operational status of a device in the network 106, the most-frequently used device in the network 106, the least-frequently used device in the network 106, and/or any other media statistics or aggregate information that may be determined from the heartbeat data. The device health analyzer 108 additionally determines the type of failure mode associated with the component of the device or the device as well as provides a remedy action to address the failure mode. Media presentation device information may be useful to manufacturers and/or owners/users of devices to determine when to service devices, replace components in the devices, replace the devices with newer versions, identify trends with respect to component or device function, and/or otherwise evaluate their own devices and/or their competitors' devices.

In the illustrated example, the device health analyzer 108 sends and/or receive Internet messages (e.g., a HyperText Transfer Protocol (HTTP) request(s)) that include the heartbeat data, the type of failure mode and/or remedy action for the failure mode. Additionally or alternatively, any other method(s) to send and/or receive heartbeat data, the type of failure mode and/or remedy action for the failure mode may be used such as, for example, an HTTP Secure protocol (HTTPS), a file transfer protocol (FTP), a secure file transfer protocol (SFTP), etc.

In the illustrated example of FIG. 1, the environment 100 includes the device management agent 110. In the illustrated example, the device management agent 110 is a server or other computational device that can dispatch software patches indicated in the remedy action to the one or more devices in the measurement location 102. Alternatively, the example device management agent 110 can schedule service appointments with device manufacturers or other service entities to remedy the failure mode according to the remedy action. In some examples, the device management agent 110 is a single server or other computational device operated by the audience measurement entity. In other examples, the device management agent 110 is a server or other computational device operated by the manufacturer of the one or more devices in the measurement location 102. In further examples, the device management agent 110 is a computer or other computational device included in the measurement location 102 that is configured to interface with the one or more devices in the measurement location 102.

In the illustrated example of FIG. 1, the example media provider 111 includes an example media generator 126 and an example watermark encoder 132. The example media generator 126 is coupled to the example watermark encoder 132 and the example watermark encoder 132 is coupled to the example network 106. The example watermark encoder 132 includes an example heartbeat data monitor 130*h*.

In the illustrated example of FIG. 1, the example media provider 111 is an entity that provides media to one or more media measurement locations (e.g., measurement location 102) for viewing by panelists in the one or more media measurement locations.

In the illustrated example of FIG. 1, the example media generator 126 is a server providing Internet media (e.g., web pages, audio, videos, images, etc.). The example media generator 126 may be implemented by any provider(s) of media such as a digital broadcast provider (cable television service, fiber-optic television service, etc.) and/or an on-demand digital media provider (e.g., Internet streaming video and/or audio services such as Netflix®, YouTube®, Hulu®, Pandora®, Last.fm®) and/or any other provider of streaming media services. In some other examples, the example media generator 126 is a host for web site(s). Additionally or alternatively, the media generator 126 may not be on the Internet. For example, the media provider may be on a private and/or semi-private network (e.g., a LAN, a virtual private network) to which one or more of the devices in the measurement location 102 connect.

In the illustrated example of FIG. 1, the example media provider 111 includes the example watermark encoder 132. The example watermark encoder 132 encodes watermarks into the video and audio signals that are presented to an audience via the media generator 126. Alternatively, the watermark encoder 132 may encode signatures or fingerprints into video and audio signals presented to an audience via the media generator 126. For example, the watermark encoder 132 encodes watermarks, signatures, and/or fingerprints into video and audio signals generated by the media generator 126. Additionally, the watermark encoder 132 transmits the encoded media, the media generated by the media generator 126, to the network 106.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In the illustrated example of FIG. 1, the measurement location 102 includes the access point 112. In the example, the access point 112 is an integrated router modem combination. The access point 112 of the illustrated example of FIG. 1 enables network communications of the measurement location 102 to reach the network 106. In some examples, the access point 112 is a digital subscriber line (DSL) modem, while in some other examples the access point 112 is a cable modem. In some examples, the access point 112 is a media converter that converts one communications medium (e.g., electrical communications, optical communications, wireless communications, etc.) into another type of communications medium. In some examples, the access point 112 is separate from a network gateway (e.g., a router, a link, a switch, etc.).

In the illustrated example of FIG. 1, the measurement location 102 includes the example media device 116. In the example, the media device 116 is a Blue-ray™ disk player. In other examples, the media device 116 is a digital video disk (DVD™) player. In further examples, the media device 116 is any device that receives a media input and outputs the media a media presentation device, such as the example media presentation device 120.

In the illustrated example of FIG. 1, the measurement location 102 includes the media presentation device 120. The example media presentation device 120 a device that may receive any type of media and present the media. The media presentation device 120 may be, for example, an Internet-enabled television, a personal computer, an Internet-enabled mobile handset (e.g., a smartphone), a tablet computer (e.g., an iPad), etc. The media presentation device 120 may present media sent from the media device 116 via a wired or wireless connection to the media device 116, a wired or wireless connection to a media service provider, etc. The media presentation device 120 may present the media sent to it from the media device 116 with supplementary media presentation devices such as speakers, projectors, additional screens, etc.

In the illustrated example of FIG. 1, the example measurement location 102 includes the set top box 122. In the example, the set top box 122 is a device that converts digital signals to analogue signals for viewing on a media presentation device such as the media presentation device 120. In some examples, the set top box 122 enables cable or satellite input to the media presentation device 120.

In the illustrated example of FIG. 1, the example measurement location 102 includes the example mobile device 124. The example mobile device 124 is coupled to the example access point 112. The example mobile device 124 is a cellular phone. In other examples, the mobile device 124 is a tablet computer or any other type of mobile computing device.

In some examples, the mobile device 124 is unable to transmit information via the access point 112. For example, a server upstream of the access point 112 may not provide functional routing capabilities to the network 106. In the illustrated example, the mobile device 124 includes additional capabilities to communicate with the network 106. As shown in FIG. 1, the mobile device 124 includes the capabilities to send information through the wireless communication system 104 (e.g., the cellular communication system) via the wireless communication link 128.

The example wireless communication link 128 of the illustrated example of FIG. 1 is a cellular communication link. However, any other method and/or system of communication may additionally or alternatively be used such as, for example, an Ethernet connection, a Bluetooth connection, a Wi-Fi connection, etc. Further, the wireless communication link 128 of FIG. 1 implements a cellular connection via a Global System for Mobile Communications (GSM). However, any other systems and/or protocols for communications may be used such as, for example, Time Division Multiple Access (TDMA), Code Division Multiple Access (CDMA), Worldwide Interoperability for Microwave Access (WiMAX), Long Term Evolution (LTE), etc.

In the illustrated example of FIG. 1, each of the example access point 112, the example laptop computer 114, the example media device 116, the example desktop computer 118, the example media presentation device 120, the example set top box 122, the example mobile device 124, and the example watermark encoder 132 includes a heartbeat data monitor, respectively, the example heartbeat data monitor 130a, the example data heartbeat monitor 130b, the example heartbeat data monitor 130c, the example heartbeat data monitor 130d, the example heartbeat data monitor 130e, the example heartbeat data monitor 130f, the example heartbeat data monitor 130g, and the example heartbeat data monitor 130h. In some examples, the device management agent 110 includes a heartbeat data monitor.

The example heartbeat data monitor 130a, the example data heartbeat monitor 130b, the example heartbeat data monitor 130c, the example heartbeat data monitor 130d, the example heartbeat data monitor 130e, the example heartbeat data monitor 130f, the example heartbeat data monitor 130g, and the example heartbeat data monitor 130h are monitoring devices developed by the manufacturer of the example access point 112, the example laptop computer 114, the example media device 116, the example desktop computer 118, the example media presentation device 120, the example set top box 122, the example mobile device 124, and the example watermark encoder 132, respectively.

In some examples, the example heartbeat data monitor 130a, the example data heartbeat monitor 130b, the example heartbeat data monitor 130c, the example heartbeat data monitor 130d, the example heartbeat data monitor 130e, the example heartbeat data monitor 130f, the example heartbeat data monitor 130g, and the example heartbeat data monitor 130h are software based monitors that collect heartbeat data from the example access point 112, the example laptop computer 114, the example media device 116, the example desktop computer 118, the example media presentation device 120, the example set top box 122, the example mobile device 124, and, the example watermark encoder 132, respectively.

In other examples, the example heartbeat data monitor 130a, the example data heartbeat monitor 130b, the example heartbeat data monitor 130c, the example heartbeat data monitor 130d, the example heartbeat data monitor 130e, the example heartbeat data monitor 130f, the example heartbeat data monitor 130g, and the example heartbeat data monitor 130h are hardware based monitors that collect heartbeat data from the example access point 112, the example laptop computer 114, the example media device 116, the example desktop computer 118, the example media presentation device 120, the example set top box 122, the example mobile device 124, and the example watermark encoder 132, respectively.

The example heartbeat data monitor 130a, the example data heartbeat monitor 130b, the example heartbeat data monitor 130c, the example heartbeat data monitor 130d, the example heartbeat data monitor 130e, the example heartbeat data monitor 130f, the example heartbeat data monitor 130g, and the example heartbeat data monitor 130h transmit the collected heartbeat data to the device health analyzer 108 via an application programming interface designed by the manufacturer of a device using a SDK provided by an audience measurement entity. Additionally, the SDK provided by the audience measurement entity allows the manufacturer of a device to monitors or monitoring devices that collect the heartbeat data in a manner sufficient with the needs of the audience measurement entity to identify failure modes and prescribe remedy actions to prevent damage or expedite service.

Each of the example heartbeat data monitor 130a, the example data heartbeat monitor 130b, the example heartbeat data monitor 130c, the example heartbeat data monitor 130d, the example heartbeat data monitor 130e, the example heartbeat data monitor 130f, the example heartbeat data monitor 130g, and the example heartbeat data monitor 130h is designed by the manufacturer of the respective device using the SDK provided by the audience measurement entity to monitor the example access point 112, the example laptop computer 114, the example media device 116, the example desktop computer 118, the example media presentation device 120, the example set top box 122, the example mobile device 124, and the example watermark encoder 132, respectively and interface with the device health analyzer 108.

Because of the addition of the example heartbeat data monitor 130a, the example data heartbeat monitor 130b, the example heartbeat data monitor 130c, the example heartbeat data monitor 130d, the example heartbeat data monitor 130e, the example heartbeat data monitor 130f, the example heartbeat data monitor 130g, and the example heartbeat data monitor 130h, designed using the SDK, the device health analyzer 108 is capable of analyzing manufacturer independent devices for failure modes and is capable of prescribing remedies for the failure modes.

Figure 2:
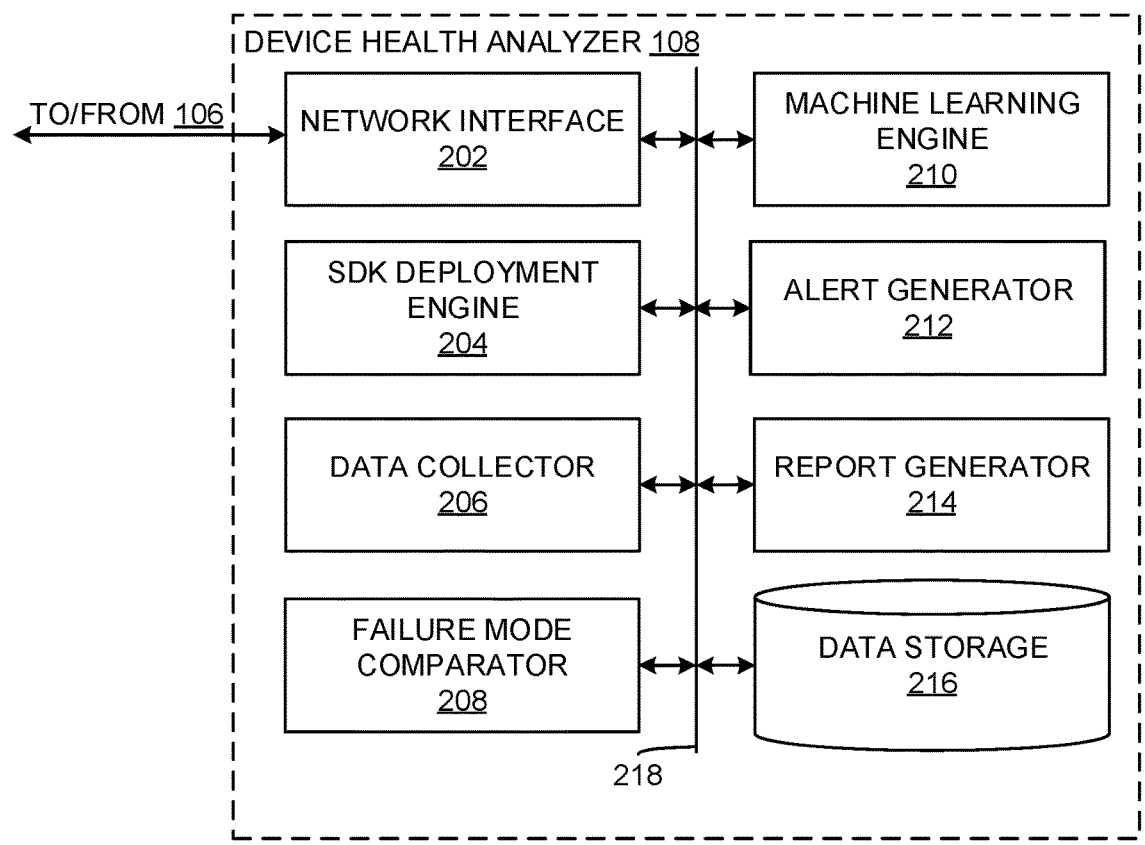
FIG. 2 is a block diagram showing further detail of the example device health analyzer of FIG. 1.

FIG. 2 is a block diagram showing further detail of the example device health analyzer 108 of FIG. 1. The example device health analyzer 108 includes an example network interface 202, an example SDK deployment engine 204, an example data collector 206, an example failure mode comparator 208, an example machine learning engine 210, an example alert generator 212, an example report generator 214, an example data storage 216, and an example communication bus 218.

In the illustrated example of FIG. 2, the example network interface 202 is coupled to the example network 106 of FIG. 1 and the example communication bus 218. Each of the example failure mode comparator 208, the example SDK deployment engine 204, the example report generator 214, the example machine learning engine 210, the example alert generator 212, the example data collector 206, and the example data storage 216 is coupled to the example communication bus 218.

In the illustrated example of FIG. 2, the example network interface 202 is a device that connects a first device (e.g., the device health analyzer 108) to a network (e.g., the network 106). The network interface 202 may be implemented as hardware or software. As a hardware the network interface 202 may be electronic circuits that facilitate the communication between a network (e.g., network 106) and the parts of a computer responsibly for processing the obtained network data (e.g., data from the network 106). The network interface 202 obtains and/or transmits information to networks that are exterior to the device health analyzer 108 such as the network 106. The network interface 202 may implement a web server to receive and/or obtain notifications including one or both of (a) heartbeat data from one or more devices in communication with the network 106 or (b) the type of the failure mode and a remedy action associated with the failure mode. The notifications including one or both of (a) heartbeat data from one or more devices in communication with the network 106 or (b) the type of the failure mode and a remedy action associated with the failure mode may be formatted as an HTTP message; however, any other message format and/or protocol may additionally or alternatively be used such as, for example, a file transfer protocol (FTP), a simple message transfer protocol (SMTP), an HTTP secure (HTTPS) protocol, etc.

The illustrated example of FIG. 2 includes the example SDK deployment engine 204. The SDK deployment engine 204 is a device that deploys an SDK that is made for a specific audience measurement entity. The SDK deployment engine 204 allows an audience measurement entity to deploy an SDK to any manufacturer of a device (e.g., an encoder, a set top box, a refrigerator, a laptop computer, a mobile device, a desktop computer, etc.). The SDK is specific to the audience measurement entity and defines parameters, protocols, and other interfacing methodology for transmitting the collected heartbeat data to the device health analyzer 108. Additionally, the SDK defines the types of data that is useful in analyzing the health of a device. In other words, the SDK deployment engine 204 configures a manufacturer independent SDK to be deployed to any original equipment manufacturer (OEM). For example, the SDK defines that a Bill of Materials (BOM), device operational specification, individual component operational specifications, expected lifespan, known failure modes for the device, known failure modes for components in the device, install date, manufacture date, or any other type of data that is useful in analyzing the health of a device. The OEM of a device uses the SDK deployed by the SDK deployment engine 204 to develop a heartbeat monitor to collect heartbeat data corresponding to a device manufactured by the OEM.

The illustrated example of FIG. 2 includes the example data collector 206. The example data collector 206 collects the heartbeat beat data provided by one or more heartbeat monitors corresponding to one or more devices in a network. For example, the data collector 206 of FIG. 2 collects and/or otherwise obtains heartbeat data from the example heartbeat data monitor 130a, the example data heartbeat monitor 130b, the example heartbeat data monitor 130c, the example heartbeat data monitor 130d, the example heartbeat data monitor 130e, the example heartbeat data monitor 130f, the example heartbeat data monitor 130g, and the example heartbeat data monitor 130h of FIG. 1 via the network interface 202 of FIG. 2. Additionally, the data collector 206 of FIG. 2 separates the collected heartbeat data into fixed data and varying data, the fixed data and the varying data corresponding to the device. In some examples, the data collector 206 collects and/or otherwise obtains historical data corresponding to a device manufactured by an OEM from the OEM. In other examples, the data collector 206 collects and/or otherwise collects the historical data corresponding to the device manufactured by the OEM over time. The data collector 206 sends the data collected via the network interface 202 to the failure mode comparator 208, the machine learning engine 210, and the data storage 216. Furthermore, the example data collector 206 identifies the candidate device based on the fixed data included in the heartbeat data.

The illustrated example of FIG. 2 includes the example failure mode comparator 208. The example failure mode comparator 208 is a device that compares the health of one or more devices in a network connected to the network interface 202. The example failure mode comparator 208 compares the health of the one or more devices in the network based on the heartbeat data collected by the example data collector 206 (e.g., based on collected heartbeat data). Additionally, the example failure mode comparator 208 compares the varying data included in the heartbeat data to at least one of historical data associated with the operation of a candidate device of interest (e.g., a type of the device) or reference data obtained from the OEM of the candidate device, the reference data associated with the operation of the type of device (e.g., the reference data specifying operational characteristics of the type of the device). The historical data and the reference data are stored in the data storage 216. In the example, the example failure mode comparator 208 generates an interrupt when the varying data collected by the data collector 206 satisfies a first threshold value based on at least one of the historical data or the reference data for the candidate device. The first threshold value describes a value for an operating condition that if the candidate device continues to operate at the value, will cause the device and/or a component of the device to fail and require the candidate device to require substantial and costly repairs or other remedy actions (actions to remedy one or more components contributing to the failure mode).

The historical data corresponds to a known operation of a device. For example, the historical data includes data from the same device (e.g., device with the same serial number) from previous data collected by the data collector 206. In such an example, the historical data additionally includes previous data collected by the data collector 206 associated with other devices of the same type as the candidate device (e.g., similar make, similar model, similar operating conditions). Furthermore, the historical data includes past failure modes for the candidate device, past failure modes for the type of the candidate device, past Pareto chart data for the candidate device, and past Pareto chart data for the type of the candidate device. Pareto chart data summarizes causes of a failure mode of a device (e.g., a failure mode of a component included in a device) and the contribution of each cause in the overall failure mode of the device.

The reference data obtained from the OEM of the candidate device corresponds to the operating conditions that are expected for the candidate device as described by the OEM of the candidate device. The reference data is supplied by the OEM of the candidate device and includes data that is relevant to determining the health of the candidate device. For example, the reference data includes maximum ratings for the candidate device, maximum ratings for components included in the candidate device, recommended operating conditions for the device, recommended operating conditions for the components includes in the candidate device, or any other reference data that the OEM of the candidate device assigns as relevant to determining the health of the candidate device.

When comparing the heartbeat data collected by the data collector to the historical data and the reference data, the failure mode comparator 208 accesses the data storage 216 for the known data and the reference data. The example failure mode comparator 208 compares the varying data included in the heartbeat data to the historical data and the reference data for the candidate device. Comparing the varying data to the historical data and the reference data allows the device health analyzer 108 to determine whether the candidate device is operating in a failure mode, the cause of the failure mode (e.g., the failure mode of a component in the candidate device) and indicate a remedy action associated with the failure mode of the candidate device.

The illustrated example of FIG. 2 includes the example machine learning engine 210. The example machine learning engine 210 obtains the collected heartbeat data from the data collector 206. The example machine learning engine 210 processes the heartbeat data to predict whether the candidate device is associated with a failure mode (e.g., associated with respective ones of failure modes). The machine learning engine 210, included in or otherwise implemented by the device health analyzer 108, generates and/or validates a trained machine learning model (e.g., a neural network) using machine learning techniques and is described in further detail in conjunction with FIG. 3. The machine learning engine 210 uses the machine learning model to generate a set of probabilities associated with the components included in the candidate device. The each of the probabilities in the set of probabilities represents a likelihood that one of the components in the candidate device is operating outside of a manufactured defined specification for the one of the components in the candidate device. If one of the probabilities of the set of probabilities satisfies a second threshold value, the machine learning engine 210 generates an interrupt and transmits the interrupt to the alert generator 212. The second threshold value corresponds to a level of likelihood that a component in the candidate device will fail soon.

The device health analyzer 108 also allows for parallel processing and in some examples executes the failure mode comparator 208 and the machine learning engine 210 simultaneously.

The illustrated example of FIG. 2 includes the alert generator 212. The example alert generator 212 determines whether the candidate device is operating in a failure mode. For example, the example alert generator 212 monitors the failure mode comparator 208 and the machine learning engine 210 for a first notification and a second notification, respectively. The example alert generator 212, in response to at least one of the fixed data or the varying data exceeding the first threshold value, generates an alert that indicates at least one of the type of the first one of the failure modes and a remedy action associated with the first one of the failure modes. The alert generator 212 determines the type of the first one of the failure modes by analyzing the comparison made by the failure mode comparator 208. Additionally, the alert generator 212 generates a remedy action for the candidate device. The remedy action describes actions to be taken by the owner and/or user of a device (e.g., end user, consumer, etc.) or a certified device management agent such as the device management agent 110 of FIG. 1 to obviate the failure mode. In other words, the remedy action describes an action to be taken that prevents failure of the component of the candidate device and/or the candidate device itself. The example alert generator 212, in response to the machine learning engine 210 predicting the candidate device is associated with a failure mode, generates an alert that indicates the type of failure mode and the remedy action to obviate the failure mode and prevent failure of the candidate device or component in the candidate device.

After generating the alert, the alert generator 212 transmits the alert to the device management agent 110 of FIG. 1 via the network interface 202 of FIG. 2. The alert generator 212 transmits the alert to the device management agent 110 of FIG. 1 to provide the device management agent 110 of FIG. 1 with a predictive maintenance plan for the candidate device that reduces the overall cost, delay in use, and damages that the candidate device would face had the predictive maintenance plan not been provided to the device management agent 110.

The illustrated example of FIG. 2 includes the example report generator 214. The example report generator 214 tracks the fixed data and the reporting data over time. In some examples, the alert generator 212 access the tracked heartbeat data to determine whether the heartbeat data associated with a component of the candidate device or more generally the candidate device is trending towards a threshold value associated with the historical data and the reference data for the candidate device. In other examples, the alert generator 212 accesses the tracked heartbeat data to determine events during the time period the heartbeat data was collected that cause the heartbeat data to trend towards or away from the threshold value associated with the historical data and the reference data. The threshold value represents an operating condition that is within the SOA of the candidate device. Exceeding the threshold value indicates that if the operating condition is continued, the candidate device will be damaged or fail at the component associated with the threshold value.

The example report generator 214 is to generate and/or prepare reports describing the performance (e.g., health) of a candidate device. The example report generator 214 prepares measurement reports indicative of the performance of components of the candidate device and the overall performance of the candidate device. In some examples, the example report generator 214 generates a report identifying a live Pareto chart for the candidate device, the live Pareto chart based on real-time data (e.g., data collected within a threshold amount of time). The live Pareto chart breaks down the effect that the performance of each of the components in the device have on the overall performance of the device and likelihood that the candidate device will fail. The example report generator 214 may prepare a report including a graphical representation of the collected heartbeat data over time. In such a report, the graphical representation of the collected heartbeat data allows a user of the candidate device, an owner of the candidate device, and/or the OEM of the candidate device to track the performance of the candidate device over time. In some instances, such a report includes an expected value for the remaining lifetime of the device. In other instances, such a report includes an analysis on specific events during the period of time for which heartbeat data was collected that caused the candidate device to trend towards or away from the threshold value associated with the SOA of the candidate device.

The data storage 216 of the illustrated example device health analyzer 108 stores historical data associated with devices, references data associated with the devices, known failure modes for the devices, known failure modes for components in the devices, and/or any other suitable data that can be used by the device health analyzer 108 to analyze the health of a candidate device and predict whether the device is operating in a failure mode. Additionally or alternatively, the data storage 216 can store remedy actions known as successful in obviating a failure mode.

In one example of operation, the device health analyzer 108 analyzes the health of a watermark encoder, for example the watermark encoder 132 of FIG. 1. For example, the SDK deployment engine 204 of an audience measurement entity configures a manufacturer independent SDK outlining the type of heartbeat data needed to identify failure modes and determine remedy actions. The SDK also outlines the protocols for communicating with the audience measurement entity. The example SDK deployment engine 204 deploys the SDK to an employee of the OEM of the watermark encoder 132 of FIG. 1. The employee of the OEM develops a heartbeat monitor, for example the heartbeat data monitor 130h. Additionally, the data collector 206 collects reference data associated with the example watermark encoder 132 from the OEM of the watermark encoder 132. The reference data includes, for example, OEM specification data for the watermark encoder 132, expected conditions for different modes of operation, a BOM for the watermark encoder 132, and an expected lifecycle of the watermark encoder 132. The example data collector 206 collects the reference data via the network interface 202 and stores the reference data in the example data storage 216. Additionally, the example data collector 206 collects heartbeat data from the heartbeat data monitor 130h via the network interface 202 and sends the heartbeat data to the failure mode comparator 208, the machine learning engine 210, and the data storage 216.

In operation, the heartbeat data collected by the data collector 206 includes fixed data and varying data. In the example where the candidate device is the watermark encoder 132 of FIG. 1, the fixed data includes, for example, serial number, sim card status, sim card Identifier, software version information, alarm state, and alert state. In such an example, the varying data includes, for example, active alarm status, active alert status, cell signal strength, cell modem failure count, various temperatures of components, and fan speed. In operation, the data collector 206 separates the heartbeat data into the fixed data and the varying data. Furthermore, the data collector 206 identifies the candidate device as the watermark encoder 132 based on the fixed data.

For example, the reference data for the watermark encoder 132 includes the operating temperature of the watermark encoder 132, the operating condition of the processor in the watermark encoder 132, the maximum amount of allowed on-time for the watermark encoder 132, and the operating condition for the cooling fan in the watermark encoder 132. The operating temperature of the watermark encoder 132 is between 0 degrees Celsius and 40 degrees Celsius. The operating condition of the processor in the watermark encoder 132 is between 0 degrees Celsius and 90 degrees Celsius. The maximum amount of allowed on-time for the watermark encoder 132 is 100,000 hours. The operating condition for the cooling fan in the watermark encoder 132 is 6000 rotations per minute (RPM).

In operation, the failure mode comparator 208 accesses the reference data and the historical data for the watermark encoder 132, stored in the data storage 216 and compares the varying data included in the heartbeat data from the watermark encoder 132. Additionally, the report generator 214 tracks the varying data for the watermark encoder 132 over time. Furthermore, the example machine learning engine processes the heartbeat data using a machine learning model including trained parameters to generate a set of probabilities indicative of the likelihood that a component of the watermark encoder 132 will fail.

In operation, the alert generator 212, in response to at least one of the set of probabilities satisfying a first threshold value based on the trained parameters of the machine learning engine generates an alert indicating the type of the failure mode and a remedy action. Additionally, the alert generator 212, in response to at least one of the fixed data or the varying data satisfying a second threshold value based on the at least one of the historical data or the reference data, generates the alert indicating at least one of the type of the first one of the failure modes and the remedy action associated with the first one of the failure modes. Furthermore, the report generator 214 generates profiles describing the health of the watermark encoder 132. An example profile generated by the report generator 214 is shown below in Table 1.

TABLE 1

| Component/Alarm States/Details | Specification | Lifespan | Part of Heartbeat? | Comments |
|---|---|---|---|---|
| Encoder | 0-40 C. | | Yes - Temperature 1 | Operational Temperature of the Encoder and other specs |
| Serial Number | Packet Data - Unique (Key) | Permanent | Yes-6 Alphanumeric Characters | Unique to each encoder |
| Sim Card Present | Unit Data | Semi Perm | Yes - Boolean | Cell Modem SIM card installed |
| Sim Card ID | Unit Data | Semi Perm | Yes - 25 max char | Unique SIM card Identifier |
| Make | Manufacturer | Permanent | | |
| Model | Model Type | Permanent | | |
| HW Version | | Permanent | | |
| SW Version | Packet Data | Semi Perm | Part of the packet data | |
| FW Version | | Semi Perm | | |
| Main Chipset | BOM | 100,000 Power On hours at 0 C. to 90 C. | | |
| Temperature 1 | Unit Data | | Yes - Integer | Temperature inside the unit |
| Temperature 2 | Unit Data | | Yes - Integer | Temperature inside the unit near processor |
| RAM | BOM | | | This is important as fretting can occur on cards causing failures in memory |
| Fan Speed | Unit Data | | Yes - Integer | 6000 RPMs is the spec limit from the manufacturer |
| CodeChk Fail | Alarm Event Data | | Part of Event Code - Alarm | |
| Low Level | Alarm Event Data | | Part of Event Code - Alarm | |
| Over Range | Alarm Event Data | | Part of Event Code - Alarm | |
| Clock Drift | Alarm Event Data | | Part of Event Code - Alarm | |
| Clock Error | Alarm Event Data | | Part of Event Code - Alarm | |
| Device Error | Alarm Event Data | | Part of Event Code - Alarm | |
| Bad Device | Alarm Event Data | | Part of Event Code - Alarm | |
| Cell Signal Strength | Unit Data | | Yes - Integer | Scale of 0 to 100, 100 being the best |
| Cell Modem Day Usage | Unit Data | | Yes - Integer | |
| Cell Modem Failure Counts | Unit Data | | Yes - Integer | Total count of failures in comm attempts over the cell modem |
| Resets | | | | |

The profile shown in Table 1 allows the user, owner, and/or OEM of the watermark encoder 132 to determine how the watermark encoder 132 operates over time, types of events that bring the watermark encoder 132 towards the threshold values associated with the operating conditions of the watermark encoder 132 and allow the user, owner, and/or OEM of the watermark encoder 132 to improve the functionality of the watermark encoder 132. Furthermore, the alert generator 212 can access the profile of Table 1 to determine whether temperature 1 and temperature 2 are increasing over time. For example, the report generator 214 tracks the data over a six-month period. Over that period of time, temperature 1 increases from 35 degrees Celsius to 44 degrees Celsius and temperature 2 increases from 36 degrees Celsius to 45 degrees Celsius. Over the same six-month period, the report generator 214 tracks the fan rotation speed. Over the six-month period, the fan speed decreases from 6049 RPM to 1500 RPM. Over that same period of time, the report generator 214 tracks the device error count. The alert generator 212 access the tracked heartbeat data and determines that temperature 1 and temperature 2 are trending upwards towards a first threshold value associated with temperature 1 and a second threshold value associated with temperature 2. The alert generator 212 also determines that the fan speed is trending downward to a third threshold value associated with the fan speed. Based on the fixed data, the alert generator 212 determines that the watermark encoder 132 is only halfway through its expected lifetime. Based on the fixed data, varying data, historical data, and reference data, the alert generator 212 indicates that the type of the failure mode is a deficient fan. The remedy action indicated in the alert to the device management agent 110 is to replace the fan. The remedy action improves the processing efficiency indicated by the alert generator 212 increases the computational efficiency of the watermark encoder 132 by reducing the computational waste associated with operating at higher temperatures, reducing the number of device errors, and increasing the lifetime of the watermark encoder 132. Additionally, the remedy action is likely to be a much lower cost to the user and/or owner of the watermark encoder 132 than the cost of replacing an entire watermark encoder that would result from catastrophic thermal failure resulting from a poorly operating cooling fan.

Figure 3:
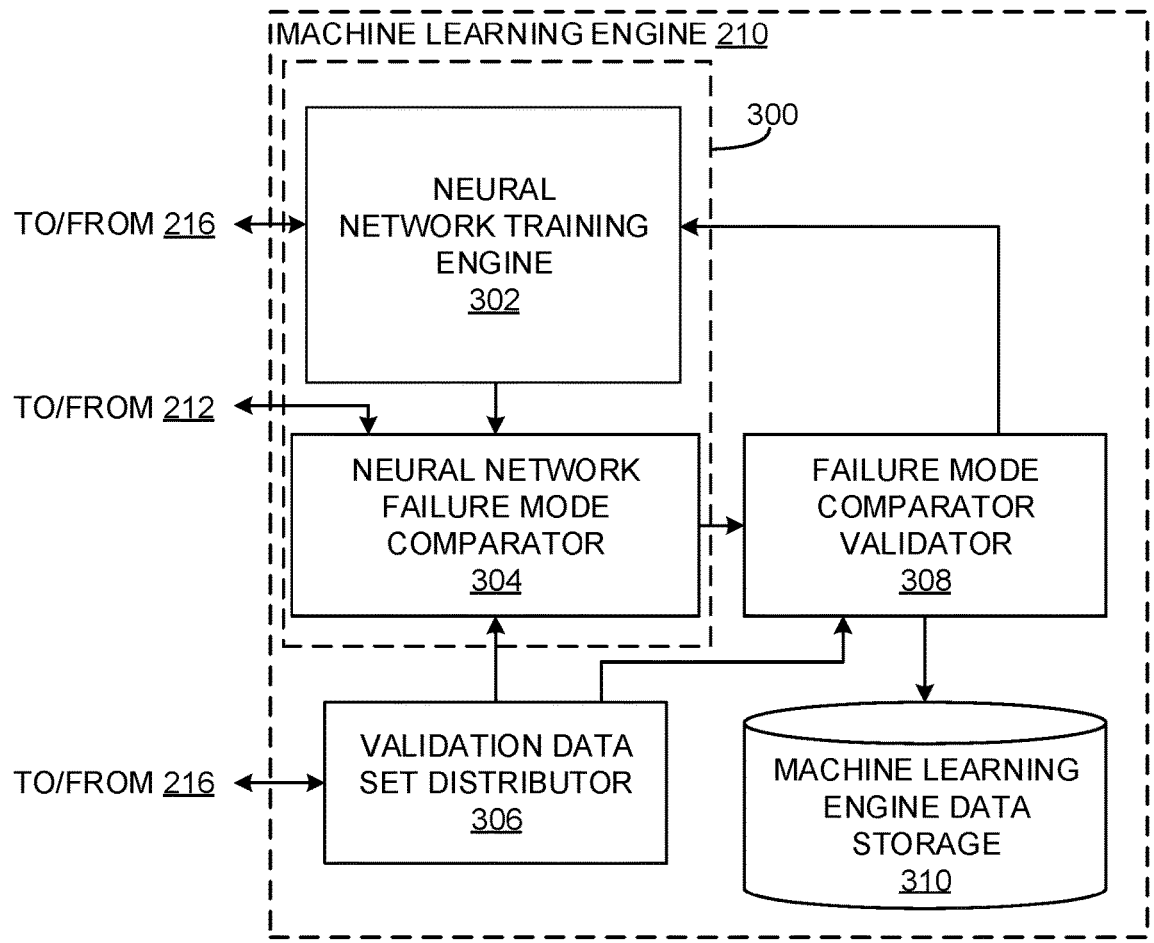
FIG. 3 is a block diagram showing of an example machine learning engine shown in FIG. 2.

FIG. 3 is a block diagram showing of an example machine learning engine shown in FIG. 2. The machine learning engine 210, in some examples, includes an example neural network 300, an example neural network training engine 302, an example neural network failure mode comparator 304, an example validation data set distributor 306, and example neural network failure mode comparator validator 308, and an example machine learning engine data storage 310.

In the neural network failure mode comparator 304 of the example FIG. 3, the failure mode determination process is driven by the neural network training engine 302 and the validation data set distributor 306. The neural network failure mode comparator 304 utilizes a trained machine learning model provided by the neural network training engine 302 to generate failure mode determinations for one or more operating conditions. The neural network training engine 302, in some examples, deploys the machine learning model to the neural network failure mode comparator 304 to generate more accurate results.

An artificial neural network such as the neural network 300 is a computer system architecture model that learns to do tasks and/or provide responses based on evaluation or "learning" from examples having known inputs and known outputs. A neural network such as the neural network 300 features a series of interconnected nodes referred to as "neurons" or nodes. Input nodes are activated from an outside source/stimulus, such as input from the data storage 216. The input nodes activate other internal network nodes according to connections between nodes (e.g., governed by machine parameters, prior relationships, etc.). The connections are dynamic and can change based on feedback, training, etc. By changing the connections, an output of the neural network 300 can be improved or optimized to produce more/most accurate results. For example, the neural network 300 can be trained using information from one or more sources to map inputs to a failure mode, etc.

Machine learning techniques, whether neural networks, deep learning networks, support vector machines, and/or other experiential/observational learning system(s), can be used to generate optimal results, locate an object in an image, understand speech and convert speech into text, and improve the relevance of search engine results, for example. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

For example, deep learning that utilizes a convolutional neural network (CNN) segments data using convolutional filters to locate and identify learned, observable features in the data. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which include low level features. While examining an image, for example, rather than looking for an object, it is more efficient to look for edges which form motifs which form parts, which form the object being sought. These hierarchies of features can be found in many different forms of data.

Learned observable features include objects and quantifiable regularities learned by the machine during supervised learning. A machine provided with a large set of well classified data is better equipped to distinguish and extract the features pertinent to successful classification of new data.

A deep learning machine that utilizes transfer learning can properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given situation.

An example deep learning neural network can be trained on a set of expert classified data, for example. This set of data builds the first parameters for the neural network, and this would be the stage of supervised learning. During the stage of supervised learning, the neural network can be tested whether the desired behavior has been achieved.

Once a desired neural network behavior has been achieved (e.g., a machine has been trained to operate according to a specified threshold, etc.), the machine can be deployed for use (e.g., testing the machine with "real" data, etc.). During operation, neural network classifications can be confirmed or denied (e.g., by an expert user, expert system, reference database, etc.) to continue to improve neural network behavior. The example neural network is then in a state of transfer learning, as parameters for classification that determine neural network behavior are updated based on ongoing interactions. In certain examples, the neural network such as the neural network training engine 302 can provide direct feedback to another process, such as the neural network failure mode comparator 304, etc. In certain examples, the neural network 300 outputs data that is buffered (e.g., via the cloud, etc.) and validated before it is provided to another process.

In the example of FIG. 3, the machine learning engine includes the example neural network 300, the example validation data set distributor 306, the example neural network failure mode comparator validator 308, and the example machine learning engine data storage 310. The example neural network includes the example neural network training engine 302 and the example neural network failure mode comparator 304. The neural network 300 receives input of reference data and historical data for a candidate device from the data storage 216. Through a comparison of the heartbeat data to the historical and reference data received from the data storage 216, the neural network training engine 302 outputs an algorithm (e.g., a machine learning model) to the neural network failure mode comparator 304 to determine (e.g., predict) whether heartbeat data is a failure mode based on previously received heartbeat data for the known failure modes. The neural network training engine 302 can be seeded with some initial correlations and can then learn from ongoing experience. In some examples, the neural network training engine 302 continuously receives feedback from the data storage 216.

The machine learning model includes trained parameters associated with a candidate device. In some examples, the neural network training engine 302 is trained through supervised machine learning. In such examples, the machine learning model is deployed to the neural network failure mode comparator 304 and is, in such examples, validated using reference data and historical data for a portion of failure modes and/or non-failure modes from the data storage 216 different from the portion of reference data and the historical data from the data storage 216 used to train the neural network training engine 302. For example, 80% of the heartbeat data may be used to train the neural network training engine 302 and 20% of the heartbeat data can be used to validate the trained neural network deployed to the neural network failure mode comparator 304.

In some examples, the neural network training engine 302 is trained through unsupervised machine learning. In such an example, the neural network training engine 302 accesses heartbeat data collected for a candidate device. For example, the neural network training engine 302 accesses heartbeat data stored in the data storage 216 for a candidate type of device (e.g., the watermark encoder 132). The neural network training engine 302 correlates the heartbeat data from 1,000 different devices of the type of the candidate device and determines the common operating conditions across the 1,000 devices. The neural network training engine 302 determines outliers from the common operating conditions of the 1,000 devices and identifies the outliers as failure modes. After a significant or threshold amount of heartbeat data has been collected from a sufficient number of devices of the type of the candidate device, the neural network training engine 302 transmits a machine learning model including trained parameters to the neural network failure mode comparator 304.

In some examples, the validation process includes the validation data set distributor 306 distributing reference data and historical data for known failure modes and/or non-failure modes to the neural network failure mode comparator 304 to be executed with the currently deployed machine learning model and the known result (e.g., the operational condition is a failure mode or a non-failure mode) for the operational mode to the neural network failure mode comparator validator 308. The neural network failure mode comparator 304, using the currently deployed machine learning model, determines (e.g., predicts) whether the operational conditions are failure modes and/or non-failure modes and distributes the determinations to the neural network failure mode comparator validator 308.

In response to receiving the known results from the validation data set distributor 306 and the determined (e.g., predicted) results from the neural network failure mode comparator 304, the neural network failure mode comparator validator 308 compares the two (2) data sets and determines a portion of the results that the machine learning model executing on the neural network failure mode comparator 304 determined correctly. For example, the neural network failure mode comparator validator 308 can determine a percentage (e.g., 98% correct, 90% correct, 40% correct, etc.) of the results the machine learning model determined correctly and compare the percentage to a threshold.

In some examples, the threshold is a predetermined value that is static throughout the operation of the device health analyzer 108. For example, the threshold may be set by an OEM that developed the heartbeat monitor based on the SDK deployed by the SDK deployment engine 204. In some examples, the threshold is a dynamic value that varies with the quantity of training data that is used by the neural network training engine 302 to generate the machine learning model deployed by the neural network failure mode comparator 304. In some examples, in response to the result satisfying the threshold (e.g., the result is greater than the threshold, the result is less than the threshold, etc.), the machine learning model is deployed to the neural network failure mode comparator 304. In some examples, in response to the result not satisfying the threshold, the neural network failure mode comparator validator 308 notifies the neural network training engine 302 that further training/re-training is required.

When the threshold is satisfied, the machine learning model deployed to the neural network failure mode comparator 304 includes trained parameters associated with non-failure mode operational conditions of a candidate device. In operation, the neural network failure mode comparator 304 processes the heartbeat data for a candidate device. The neural network failure mode comparator 304 outputs a set of probabilities to the alert generator 212 of FIG. 2. Each one of the set of probabilities represents a likelihood that a first one of the one or more components in the candidate device is operating outside of a manufacturer defined specification for the first one of the one or more components.

Further, once the machine learning model reaches a desired level of accuracy (e.g., the result satisfies the threshold), the neural network failure mode comparator validator 308 is further to deploy the generated machine learning engine (e.g., a trained boring media detection neural network) to the neural network failure mode comparator 304. In the example of FIG. 3, throughout the operational life of the machine learning engine 210, the machine learning model is continuously trained via feedback (e.g., additional heartbeat data for failure modes and/or non-failure modes) and the neural network failure mode comparator 304 can be updated based on an updated machine learning model generated by the neural network training engine 302. The machine learning model can learn and evolve based on role, location, situation, etc.

In some examples, once the neural network failure mode comparator validator 308 validates (e.g., accepts) the generated machine learning model, at least one of the machine learning model deployed from the neural network training engine 302, failure mode determinations as determined by the alert generator 212 of FIG. 2, and/or machine learning model validation data as determined by the neural network failure mode comparator validator 308 can be stored in the machine learning engine data storage 310, included in or otherwise implemented by the machine learning engine 210. In some examples, the machine learning engine data storage 310 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The machine learning engine data storage 310 can additionally or alternatively be implemented by one or more double data rate (DDR) memories such as DDR, DDR2, DDR3, mobile DDR (mDDR), etc. The machine learning engine data storage 310 can additionally or alternatively be implemented by one or more mass storage devices such as hard disk drive(s), compact disk drive(s), digital versatile disk drive(s), etc. While in the illustrated example the machine learning engine data storage 310 is illustrated as a single database, the machine learning engine data storage 310 can be implemented by any number and/or type(s) of databases. Further, the data stored in the machine learning engine data storage 310 can be in any format such as binary data, comma delimited data, tab delimited data, structured query language (SQL) structures, etc.

While an example manner of implementing the example device health analyzer 108 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 202, the example SDK deployment engine 204, the example data collector 206, the example failure mode detector 208, the example machine learning engine 210, the example alert generator 212, the example report generator 214 and/or, more generally, the example device health analyzer 108 of FIG. 2 may be implemented by hardware, software, firmware and/or any combination of hardware, software and/or firmware. Thus, for example, any of the example network interface 202, the example SDK deployment engine 204, the example data collector 206, the example failure mode detector 208, the example machine learning engine 210, the example alert generator 212, the example report generator 214 and/or, more generally, the example device health analyzer 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example SDK deployment engine 204, the example data collector 206, the example failure mode detector 208, the example machine learning engine 210, the example alert generator 212, the example report generator 214 and/or, more generally, the example device health analyzer 108 is/are hereby expressly defined to include a non-transitory computer readable storage device or storage disk such as a memory, a digital versatile disk (DVD), a compact disk (CD), a Blu-ray disk, etc. including the software and/or firmware. Further still, the example device health analyzer 108 of FIGS. 1 and 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
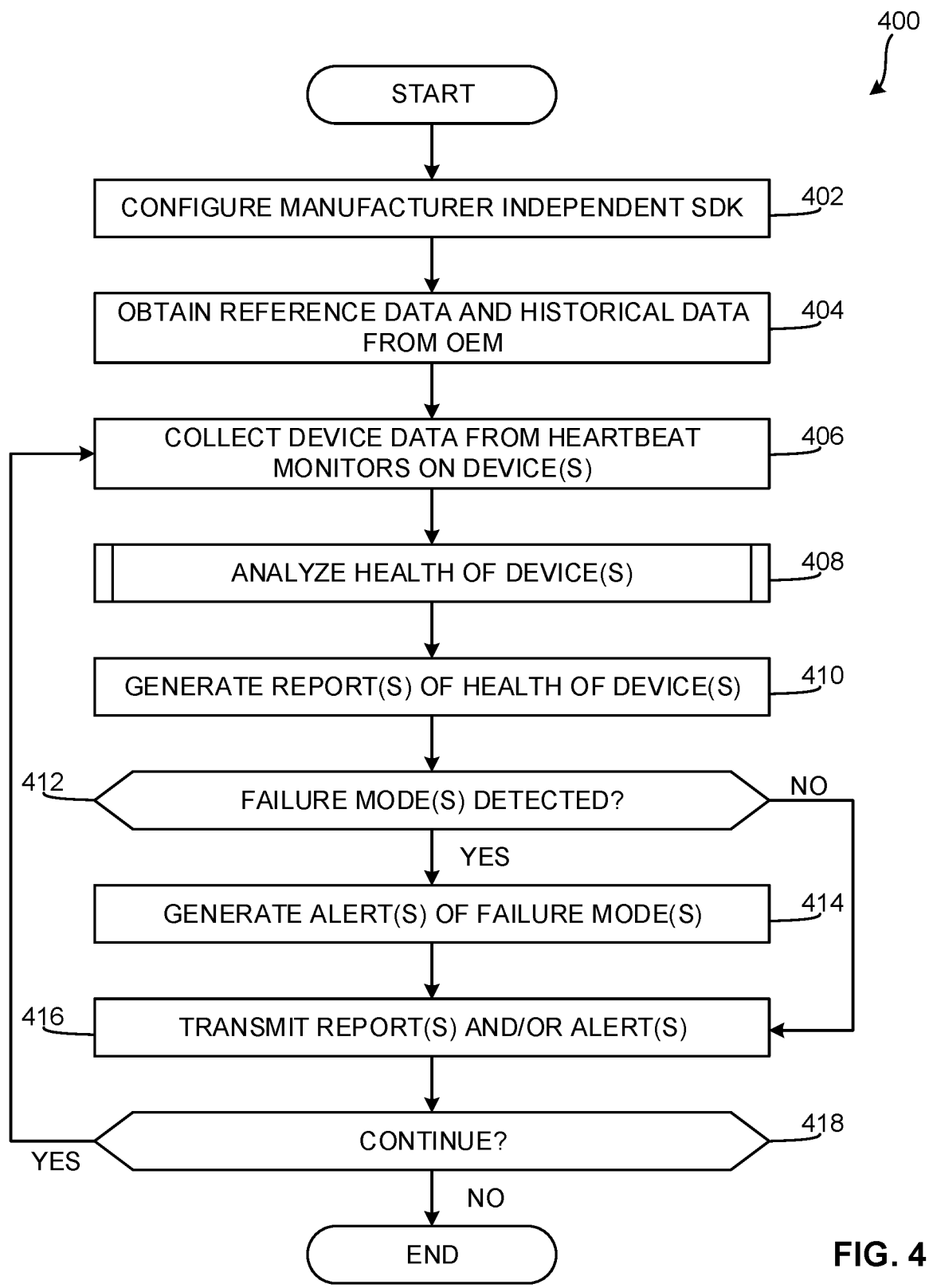
FIG. 4 is a flowchart representative of machine readable instructions which may be executed to implement the example device health analyzer of FIGS. 1 and 2.
Figure 5:
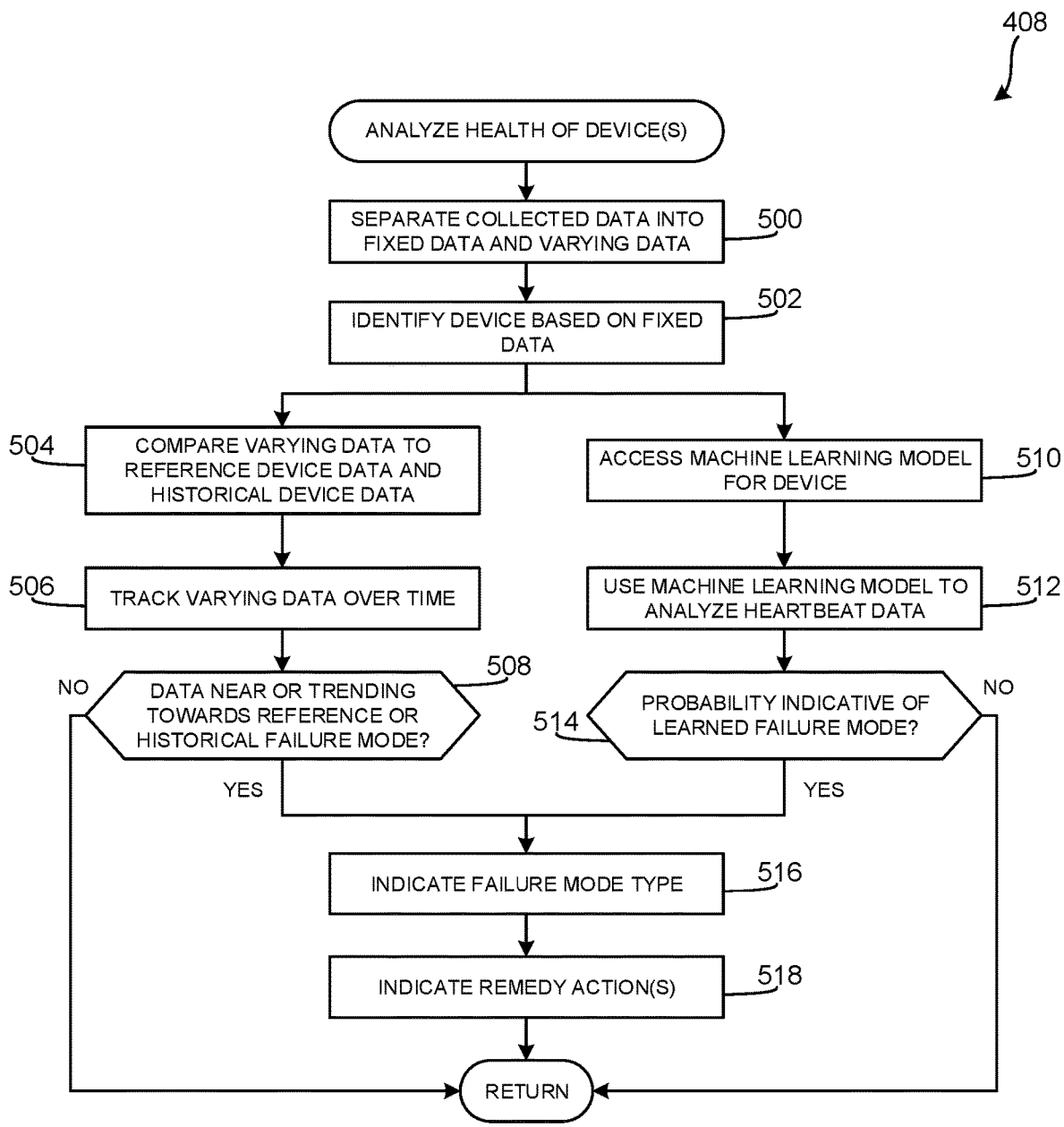
FIG. 5 is a flowchart representative of machine readable instructions which may be executed to implement the example device health analyzer of FIGS. 1 and 2 to analyze the health of one or more devices.
Figure 6:
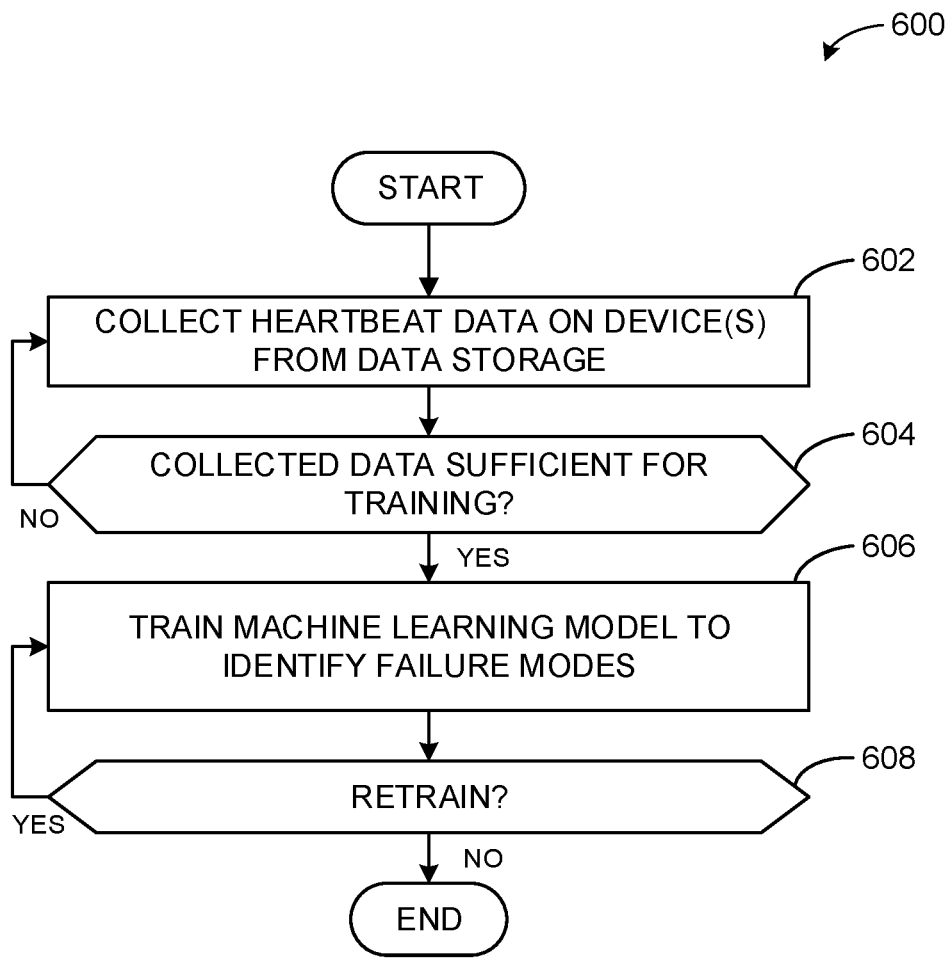
FIG. 6 is a flowchart representative of machine readable instructions which may be executed to train the example machine learning engine of FIGS. 2 and 3.

A flowchart representative of example hardware logic, machine readable instructions, hardware implemented state machines, and/or any combination thereof for implementing the device health analyzer 108 of FIGS. 1 and 2 is shown in FIGS. 4, 5, and 6. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 4, 5, and 6, many other methods of implementing the example device health analyzer 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4, 5, and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 4 is a flowchart representative of machine readable instructions which may be executed to implement the example device health analyzer of FIGS. 1 and 2. The program 400 of FIG. 4 begins at block 402 where the example SDK deployment engine 204 configures a manufacturer independent SDK to be deployed to OEMs. Additionally, at block 402, the SDK deployment engine deploys the SDK to one or more OEMs. The SDK deployment engine 204 deploys the SDK to the OEMs so that the OEMs can develop a heartbeat monitor for devices manufactured by the OEMs. The SDK defines the communication protocols for interfacing with an audience measurement entity that is to monitor the devices for the heartbeat data.

At block 404 of the program 400, the data collector 206 obtains reference data and historical data from an OEM for one or more devices manufactured by the OEM. For example, the data collector 206, at block 404, collects a BOM, an OEM specification, a datasheet, known failure modes, expected operation conditions, past heartbeat data, heartbeat data associated with failure modes, heartbeat data associated with non-failure modes, or other reference data for the one or more devices that is helpful in analyzing the performance of the one or more devices. In some examples, block 404 of the program 400 is omitted. In such examples where block 404 is omitted, the device health analyzer 108 utilizes unsupervised machine learning to analyze one or more devices and indicate failure modes and remedy actions.

At block 406, the data collector 206 collects heartbeat data from one or more heartbeat monitors on one or more candidate devices. For example, the data collector 206 collects heartbeat data from the heartbeat data monitor 130h associated with the watermark encoder 132 of FIG. 1. At block 408, the device health analyzer 108 analyzes the health of one or more devices from which the data collector 206 collects heartbeat data. At block 410, the report generator 214 generates a report of the health of the candidate device. In some examples, the report generator 214 generates a report including Table 1 as discussed in connection with FIG. 2. In other examples, the report generator 214 generates a report including a real-time Pareto chart. In further examples, the report generator 214 generates a report including a graph tracking the fixed data and the varying data over time.

At block 412, the alert generator 212 determines whether a failure mode has been detected. For example, the alert generator 212 determines whether a failure mode has been detected by determining whether (a) at least one of a set of probabilities generated by the machine learning engine satisfies a first threshold value based on one or more trained parameters of a machine learning engine, or (b) at least one of the fixed data or the varying data satisfies a second threshold value based on at least one of the historical data or reference data. If the alert generator 212 determines that (a) at least one of a set of probabilities generated by the machine learning engine satisfies a first threshold value based on one or more trained parameters of a machine learning engine, or (b) at least one of the fixed data or the varying data satisfies a second threshold value based on at least one of the historical data or reference data (block 412: YES), the program 400 proceeds to block 414. However, if the alert generator 212 determines that (a) at least one of a set of probabilities generated by the machine learning engine does not satisfy a first threshold value based on one or more trained parameters of a machine learning engine, and (b) at least one of the fixed data or the varying data does not satisfy a second threshold value based on at least one of the historical data or reference data (block 412: NO), the program 400 proceeds to block 416.

At block 414, the alert generator 212 generates an alert indicating the type of the failure mode associated with the candidate device and a remedy action for the device. At block 416, the alert generator 212 transmits the report to the device management agent 110 of FIG. 1. In the example, the device management agent 110 is a server or other computing device that is maintained by the OEM of the device. The device management agent 110 may also be a computer or other processing capable machine that is owned by the owner and/or user of the candidate device. In response to receiving the report and/or alert corresponding to the candidate device, the device management agent 110 executes the remedy action. For example, if the remedy action is a software patch to reduce the processing load on one or more processors in a candidate device, the device management agent 110 executes the software patch on the one or more processors. In other examples, the remedy action is the replacement of a cooling fan. In such an example, the device management agent 110 schedules an appointment with a servicing agent. In some examples the servicing agent is associated with the OEM. In other examples, the servicing agent is a third party.

At block 418, the device health analyzer 108 determines whether to continue the program 400. If the device health analyzer 108 determines to continue the program 400 (block 418: YES), the program 400 continues at block 406. However, if the device health analyzer 108 determines not to continue the program 400 (block 418: NO), the program 400 ends. Examples of situations that would cause the device health analyzer 108 to determine not to continue the program 400 include loss of power connection, loss of connectivity with one or more heartbeat monitors, and decommissioning of the candidate device.

FIG. 5 is a flowchart representative of machine readable instructions which may be executed to implement the example device health analyzer 108 of FIGS. 1 and 2 to analyze the health of one or more devices at block 408 of the program 400 of FIG. 4. The sub-program 408 begins at block 500 where the data collector 206 separates the heartbeat data collected from one or more candidate devices into fixed data and varying data. For example, at block 500, the data collector 206 separates the heartbeat data based on designators in the heartbeat data collected from the heartbeat monitors.

At block 502, the data collector 206 identifies the device based on the fixed data. For example, at block 502, the data collector 206 accesses the data storage 216 for serial numbers, device make, device model, or other historical data or reference data to identify the candidate device. The sub-program 408 continues from block 502 to block 504 and block 510 simultaneously. For example, one or more processor executing the machine readable instructions of the sub-program 408 utilizing parallel processing techniques. In other examples, one or more processor executing the machine readable instructions of the sub-program 408 executes the instructions of blocks 504, 506, 508 and block 510, 512, 514 serially.

At block 504, the failure mode comparator 208 compares the varying data to historical data and reference data associated with one or both of the candidate device or a type of the candidate device. For example, the failure mode comparator 208 compares the varying data collected by the data collector 206 to a threshold value associated with an operating condition that if continued would lead to a failure of the candidate device, or one or more components in the candidate device (e.g., a failure mode).

At block 506, the report generator 214 tracks the varying data over time. For example, every time step n that heartbeat data is collected by the data collector 206, the report generator 214 enters into a data structure, a data entry for each of the datapoints in the varying data. The tracked varying data is available to the alert generator 212.

At block 508, the alert generator 212 determines whether the varying data is near to or trending towards a failure mode associated with one or more of the historical data or the reference data. The alert generator 212 determines whether the varying data is near to or trending towards a failure mode associated with one or more of the historical data or the reference data by monitoring the failure mode comparator 208 for a first interrupt. In some examples, the first interrupt is a hardware interrupt. In other examples, the first interrupt is a software interrupt. If the alert generator 212 detects the first interrupt from the failure mode comparator 208 (block 508: YES), the sub-program 408 continues to block 516. However, if the alert generator 212 does not detect the first interrupt from the failure mode comparator 208 (block 508: NO), the sub-program 408 returns to the program 400.

At block 510, the machine learning engine 210 accesses a machine learning model associated with one or more of the candidate device or the type of the candidate device. More specifically, the neural network failure mode comparator 304 accesses the machine learning model associated with one or more of the candidate device or the type of the candidate device stored in the machine learning engine data storage 310.

At block 512, the machine learning engine 210 uses the machine learning model associated with one or more of the candidate device or the type of the candidate device to analyzer the heartbeat data. More specifically, the neural network training engine 302 obtains the heartbeat data for the candidate device from the data storage 216 and inputs the heartbeat data into the machine learning model. The machine learning model includes trained parameters that allow the machine learning model to output a set of probabilities that represent a likelihood that one or more of the components included in the candidate device is operating outside of a manufacturer defined specification for the one or more components.

At block 514, the alert generator 212 determines whether at least one of the set of probabilities is indicative of a learned failure mode. The alert generator 212 determines whether the at least one of the set of probabilities satisfies a second threshold value based on the one or more trained parameters of the machine learning model used by the neural network failure mode comparator 304 by monitoring the neural network failure mode comparator 304 for a second interrupt. In some examples, the second interrupt is a hardware interrupt. In other examples, the second interrupt is a software interrupt. If the alert generator 212 detects the second interrupt from the neural network failure mode comparator 304 (block 514: YES), the sub-program 408 continues to block 516. However, if the alert generator 212 does not detect the second interrupt from the neural network failure mode comparator 304 (block 514: NO), the sub-program 408 returns to the program 400.

At block 516, alert generator 212 indicates a type of the failure mode associated with the candidate device. The alert generator 212 determines the type of the failure mode by analyzing the comparison made by one or both of the failure mode comparator 208 or the neural network failure mode comparator 304. After determining the type of the failure mode, the alert generator 212 indicates the type of the failure mode.

At block 518, the alert generator 212 indicates a remedy action associated with the failure mode. For example, the alert generator 212 indicates an action that is to at least prevent the candidate device from failing, improve the functionality of the candidate device, reduce the cost associated with maintaining the candidate device, and/or increase the lifetime of the candidate device. After block 518, the sub-program 408 returns to the program 400.

FIG. 6 is a flowchart representative of machine readable instructions which may be executed to train the example machine learning engine 210 of FIGS. 2 and 3. The program 600 of FIG. 6 begins at block 602 where the neural network training engine 302 collects heartbeat data from the data storage 216.

At block 604, the neural network training engine 302 determines whether the collected heartbeat data is sufficient for training the parameters of a machine learning model associated with a candidate device. For example, if the machine learning model is an unsupervised machine learning model, the neural network training engine 302 determines whether the data storage 216 includes heartbeat data from a threshold number of the type of the candidate device. The threshold number of devices corresponds to the number of devices from which the unsupervised machine learning model can generate a common set of operating conditions to identify outlier operating conditions. If the machine learning model is a supervised machine learning model, the neural network training engine 302 determines whether the data storage 216 includes sufficient heartbeat data associated with known failure modes and sufficient heartbeat data associated with manufacturer defined operating conditions. If the neural network training engine 302 determines that the collected data is sufficient for training (block 604: YES), the program 600 continues to block 606. If the neural network training engine 302 determines that the collected data is not sufficient for training (block 604: NO), the program 600 continues to block 602.

At block 606, the neural network training engine 302 trains the machine learning model to identify failure modes associated with the candidate device. At block 608, the neural network failure mode comparator validator 308 determines whether to retrain the parameters included in the machine learning model. If the neural network failure mode comparator validator 308 determines to retrain the parameters included in the machine learning model (block 608: YES), the program 600 continues to block 606. If the neural network failure mode comparator validator 308 determines not to retrain the parameters included in the machine learning model (block 608: NO), the program 600 ends.

Figure 7:
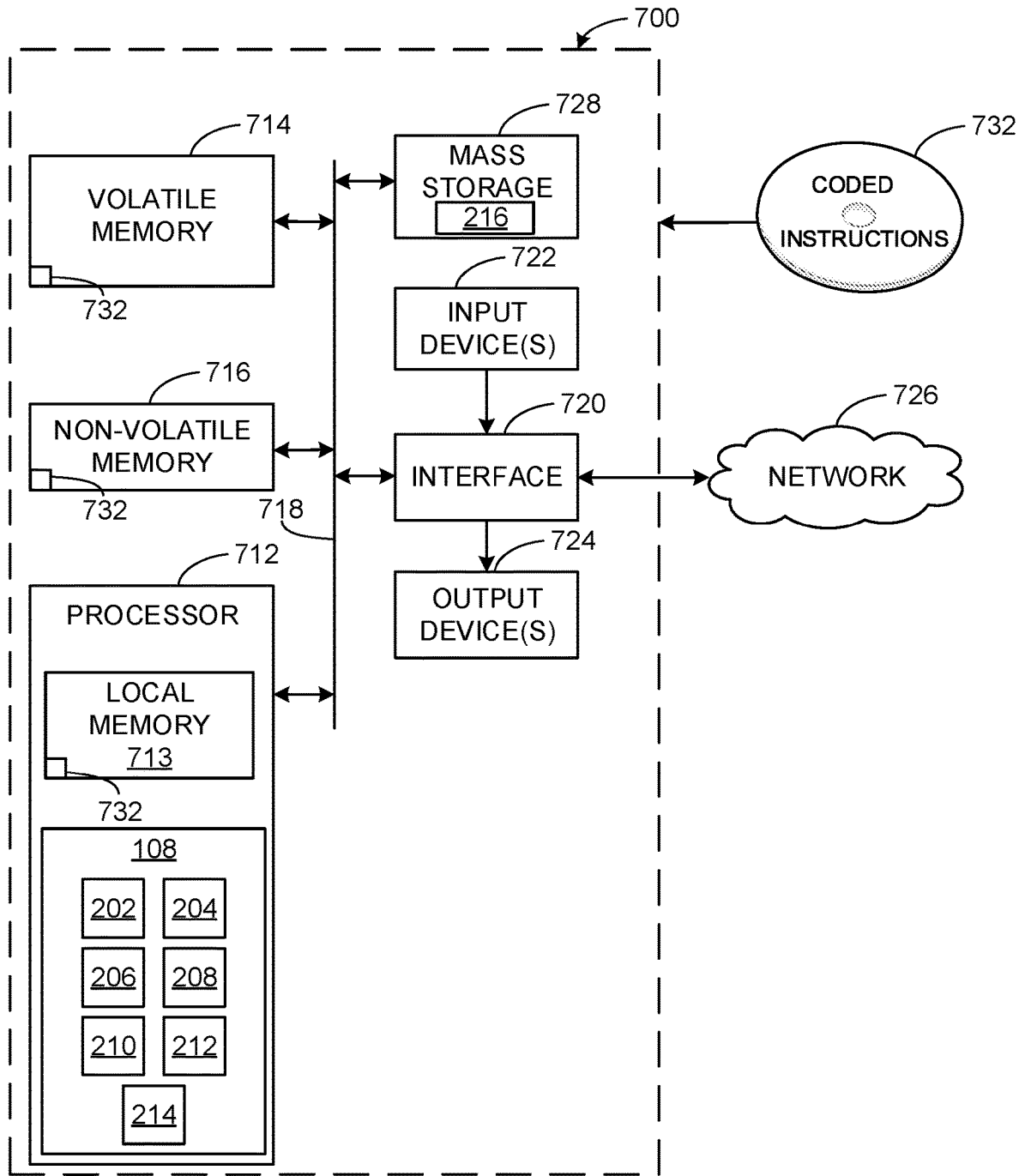
FIG. 7 is a block diagram of an example processing platform structured to execute the instructions of FIGS. 4, 5, and 6 to implement the device health analyzer of FIGS. 1 and 2.

FIG. 7 is a block diagram of an example processor platform 700 structured to execute the instructions of FIGS. 4, 5, and 6 to implement the device health analyzer 108 of FIGS. 1 and 2. The processor platform 700 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 202, the example SDK deployment engine 204, the example data collector 206, the example failure mode comparator 208, the example machine learning engine 210, the example alert generator 212, and the example report generator 214.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In this example, the one or more mass storage devices implement the example data storage 216.

The machine executable instructions 732 of FIGS. 4, 5, and 6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that increase the lifetime of a computer or other network connected devices. The examples methods, apparatus, and articles of manufacture disclosed herein provide predictive analytics for computers or other network connected devices predictive maintenance plan for computers or other network connected devices that reduces the overall cost, delay in use, and damages that computers or other network connected devices would face had the predictive analytics not been provided. Examples methods, apparatus, and articles of manufacture disclosed herein at least prevent the computers or other network connected devices from failing, improve the functionality of the computers or other network connected devices, reduce the cost associated with maintaining the computers or other network connected devices, and/or increase the lifetime of the computers or other network connected devices.

The disclosed methods, apparatus and articles of manufacture improve the efficiency of using a computing device by reducing the computational burden and computational waste in a computing device executing an application in one or more failure modes of operation by indicating one or more remedy actions associated with the one or more failure modes to obviate the one or more failure modes. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to monitor performance of one or more devices, the apparatus comprising:
a software development kit (SDK) deployment engine to deploy an SDK associated with a measurement entity to a manufacturer of a first device, the SDK to define heartbeat data to be collected from the first device and interfacing techniques to transmit the heartbeat data from the first device to the measurement entity, the heartbeat data including time varying data and fixed data;
a data collector to collect, via a network, the heartbeat data from the first device;
a machine learning engine to process the heartbeat data to predict whether the first device is associated with one or more failure modes; and
an alert generator to:
generate a first alert based on a prediction from the machine learning engine associated with a first one of the one or more failure modes, the first alert to indicate at least one of (a) a type of the first one of the failure modes or (b) at least one component of the first device to be remedied according to the first one of the one or more failure modes;
generate a second alert based on at least one of the fixed data or the time varying data satisfying a threshold value, the threshold value based on at least one of (c) historical data associated with operation of a second device of a second model corresponding to a first model of the first device or (d) reference data obtained from the manufacturer and specifying operational characteristics of the first model of the first device; and cause transmission of the first alert to a management agent of the first device.

2. The apparatus of claim 1, wherein the manufacturer is a first manufacturer, the heartbeat data is first heartbeat data, the one or more failure modes are one or more first failure modes, the prediction is a first prediction, the interfacing techniques are first interfacing techniques, the management agent is a first management agent, and:
the SDK deployment engine is to deploy the SDK to a second manufacturer of a third device, the SDK to define second heartbeat data to be collected from the third device and second interfacing techniques to transmit the second heartbeat data from the third device to the measurement entity, the second manufacturer different from the first manufacturer, the third device different from the first device, the first heartbeat data different than the second heartbeat data;
the data collector is to collect the second heartbeat data from the third device;
the machine learning engine is to process the second heartbeat data to predict whether the third device is associated with one or more second failure modes; and
the alert generator is to:
generate a third alert based on a second prediction from the machine learning engine associated with a first one of the one or more second failure modes, the third alert to indicate at least one of (a) a type of the first one of the second failure modes or (b) at least one component of the third device to be remedied according to the first one of the one or more second failure modes; and
cause transmission of the third alert to a second management agent of the third device.

3. The apparatus of claim 1, wherein the threshold value is a first threshold value and the alert generator is to generate the first alert in response to at least one of a set of probabilities generated by the machine learning engine satisfying a second threshold value based on one or more trained parameters of the machine learning engine.

4. The apparatus of claim 1, wherein the historical data includes one or more of Pareto chart data, past heartbeat data, or at least one past failure mode.

5. The apparatus of claim 1, further including:
a failure mode comparator to compare the time varying data to at least one of the historical data or the reference data; and
a report generator to track the time varying data over time.

6. The apparatus of claim 1, wherein the first device is a watermark encoder.

7. An apparatus to monitor performance of one or more devices, the apparatus comprising:
one or more non-transitory computer readable media;
instructions in the apparatus; and
processor circuitry to execute the instructions to at least:
deploy an SDK associated with a measurement entity to a manufacturer of a first device, the SDK to define heartbeat data to be collected from the first device and interfacing techniques to transmit the heartbeat data from the first device to the measurement entity, the heartbeat data including time varying data and fixed data;
collect, via a network, the heartbeat data from the first device;
process the heartbeat data to predict whether the first device is associated with one or more failure modes;
generate a first alert based on a prediction associated with a first one of the one or more failure modes, the first alert to indicate at least one of (a) a type of the first one of the failure modes or (b) at least one component of the first device to be remedied according to the first one of the one or more failure modes;
generate a second alert based on at least one of the fixed data or the time varying data satisfying a threshold value, the threshold value based on at least one of (c) historical data associated with operation of a second device of a second model corresponding to a first model of the first device or (d) reference data obtained from the manufacturer and specifying operational characteristics of the first model of the first device; and
cause transmission of the first alert to a management agent of the first device.

8. The apparatus of claim 7, wherein the manufacturer is a first manufacturer, the heartbeat data is first heartbeat data, the one or more failure modes are one or more first failure modes, the prediction is a first prediction, the interfacing techniques are first interfacing techniques, the management agent is a first management agent, and the processor circuitry is to:
deploy the SDK to a second manufacturer of a third device, the SDK to define second heartbeat data to be collected from the third device and second interfacing techniques to transmit the second heartbeat data from the third device to the measurement entity, the second manufacturer different from the first manufacturer, the third device different from the first device, the first heartbeat data different than the second heartbeat data;
collect the second heartbeat data from the third device;
process the second heartbeat data to predict whether the third device is associated with one or more second failure modes;
generate a third alert based on a second prediction associated with a first one of the one or more second failure modes, the third alert to indicate at least one of (a) a type of the first one of the second failure modes or (b) at least one component of the third device to be remedied according to the first one of the one or more second failure modes; and
cause transmission of the third alert to a second management agent of the third device.

9. The apparatus of claim 7, wherein the threshold value is a first threshold value and the processor circuitry is to generate the first alert in response to at least one of a set of probabilities generated by a machine learning model satisfying a second threshold value based on one or more trained parameters of the machine learning model.

10. The apparatus of claim 7, wherein the historical data includes one or more of Pareto chart data, past heartbeat data, or at least one past failure mode.

11. The apparatus of claim 7, wherein the processor circuitry is to:
compare the time varying data to at least one of the historical data or the reference data; and
track the time varying data over time.

12. The apparatus of claim 7, wherein the first device is a watermark encoder.

13. At least one non-transitory computer readable medium comprising instructions that, when executed, cause at least one processor to at least:
deploy an SDK associated with a measurement entity to a manufacturer of a first device, the SDK to define heartbeat data to be collected from the first device and interfacing techniques to transmit the heartbeat data from the first device to the measurement entity, the heartbeat data including time varying data and fixed data;

collect, via a network, the heartbeat data from the first device;

process the heartbeat data to predict whether the first device is associated with one or more failure modes;

generate a first alert based on a prediction associated with a first one of the one or more failure modes, the first alert to indicate at least one of (a) a type of the first one of the failure modes or (b) at least one component of the first device to be remedied according to the first one of the one or more failure modes;

generate a second alert based on at least one of the fixed data or the time varying data satisfying a threshold value, the threshold value based on at least one of (a) historical data associated with operation of a second device of a second model corresponding to a first model of the first device or (b) reference data obtained from the manufacturer and specifying operational characteristics of the first model of the first device; and cause transmission of the first alert to a management agent of the first device.

14. The at least one non-transitory computer readable medium of claim 13, wherein the manufacturer is a first manufacturer, the heartbeat data is first heartbeat data, the one or more failure modes are one or more first failure modes, the prediction is a first prediction, the interfacing techniques are first interfacing techniques the management agent is a first management agent, and the instructions, when executed, cause the at least one processor to:

deploy the SDK to a second manufacturer of a third device, the SDK to define second heartbeat data to be collected from the third device and second interfacing techniques to transmit the second heartbeat data from the third device to the measurement entity, the second manufacturer different from the first manufacturer, the third device different from the first device, the first heartbeat data different than the second heartbeat data;

collect the second heartbeat data from the third device;

process the second heartbeat data to predict whether the third device is associated with one or more second failure modes;

generate a third alert based on a second prediction associated with a first one of the one or more second failure modes, the third alert to indicate at least one of (a) a type of the first one of the second failure modes or (b) at least one component of the third device to be remedied according to the first one of the one or more second failure modes; and cause transmission of the third alert to a second management agent of the third device.

15. The at least one non-transitory computer readable medium of claim 13, wherein the threshold value is a first threshold value and the instructions, when executed, cause the at least one processor to generate the first alert in response to at least one of a set of probabilities generated by a machine learning model satisfying a second threshold value based on one or more trained parameters of the machine learning model.

16. The at least one non-transitory computer readable medium of claim 13, wherein the historical data includes one or more of Pareto chart data, past heartbeat data, or at least one past failure mode.

17. The at least one non-transitory computer readable medium of claim 13, wherein the instructions, when executed, cause the at least one processor to:

compare the time varying data to at least one of the historical data or the reference data; and track the time varying data over time.

* * * * *